United States Patent [19]
Dahl

[11] Patent Number: 5,550,474
[45] Date of Patent: Aug. 27, 1996

[54] BATTERY ELECTROLYTE-LEVEL AND ELECTROLYTE-STRATIFICATION SENSING SYSTEM

[76] Inventor: Ernest A. Dahl, 3247 Breaker, Ventura, Calif. 93003

[21] Appl. No.: 730,122

[22] Filed: May 3, 1985

[51] Int. Cl.⁶ .................... G01N 27/416; H02J 7/04; H01M 10/48
[52] U.S. Cl. ............... 324/432; 324/437; 429/92; 320/48
[58] Field of Search .................... 324/432, 437, 324/445; 429/90–93; 320/48; 73/32 R, 440, 446–448; 340/636

[56] References Cited

U.S. PATENT DOCUMENTS 4,061,839  12/1977  Köhler .................... 429/93
4,129,824  12/1978  Howes .................... 324/432
4,329,406   5/1982  Dahl et al. ............... 324/432

*Primary Examiner*—Gregory C. Issing
*Attorney, Agent, or Firm*—David S. Kalmbaugh; Melvin J. Sliwka

[57] ABSTRACT

The device uses a sensor probe in which a plurality of electrolyte level sensor coils and/or specific gravity stratification indicators are stacked vertically in the walls of a hollow electrically insulating and chemically nonreactive elongated probe housing such that the sensor coils never come into contact with the electrolyte. Balanced transformers or series resonant coils are used to sense changes in electrolyte level and/or changes in specific gravity at various respective levels to indicate stratification of electrolyte. The fields of the sensors are changed by the amount of electrolyte in the area of the sensor coils. These changes operate to produce signals that are read as digital or analog outputs.

18 Claims, 3 Drawing Sheets

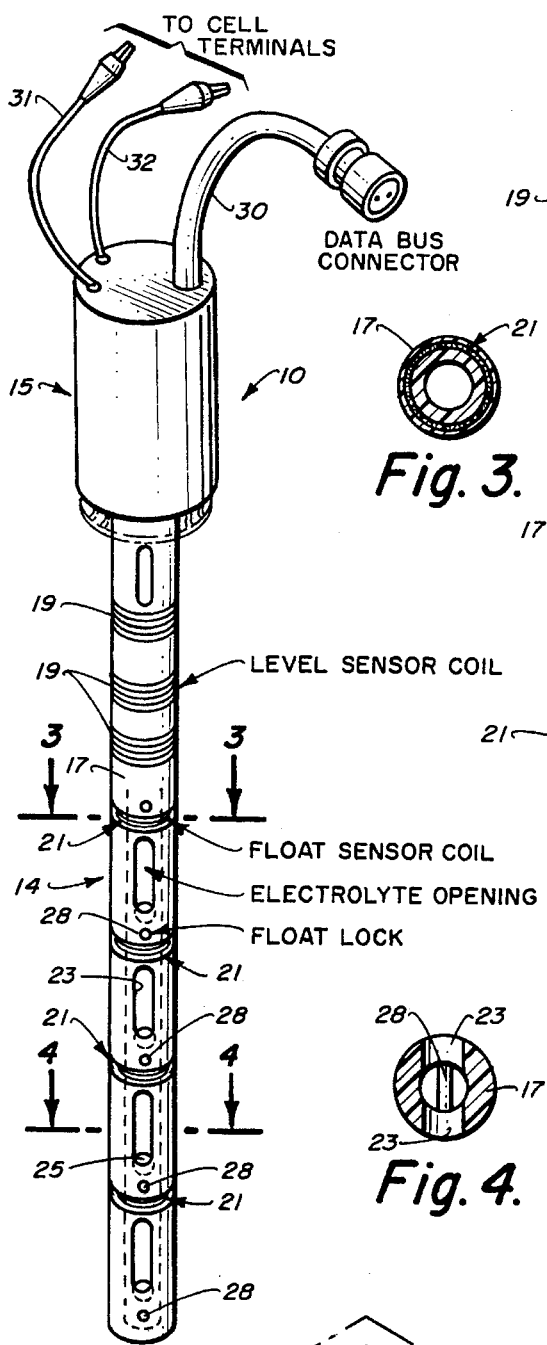
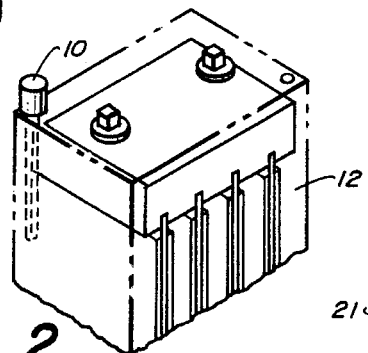
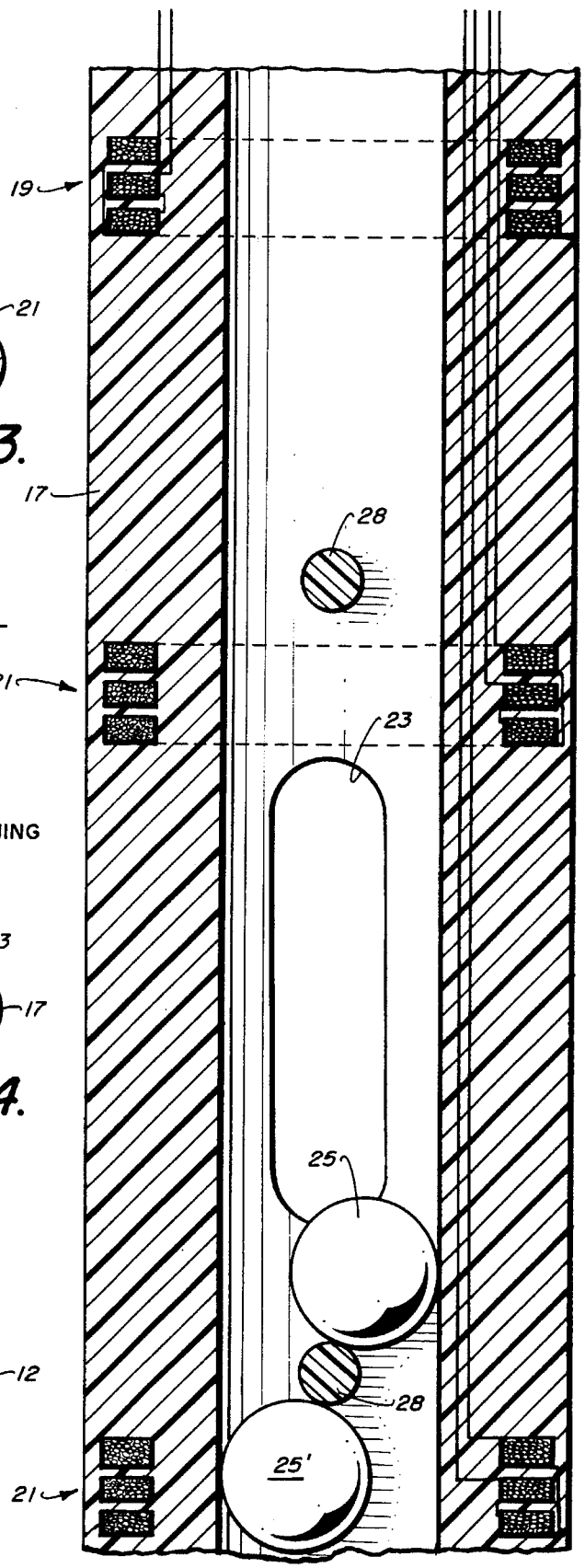

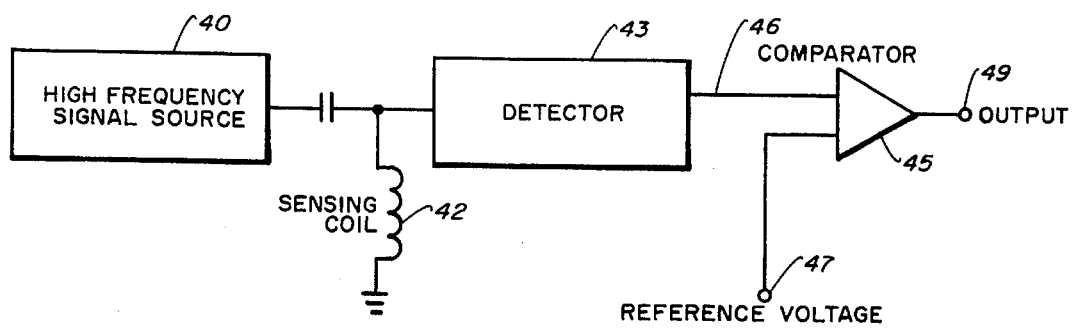
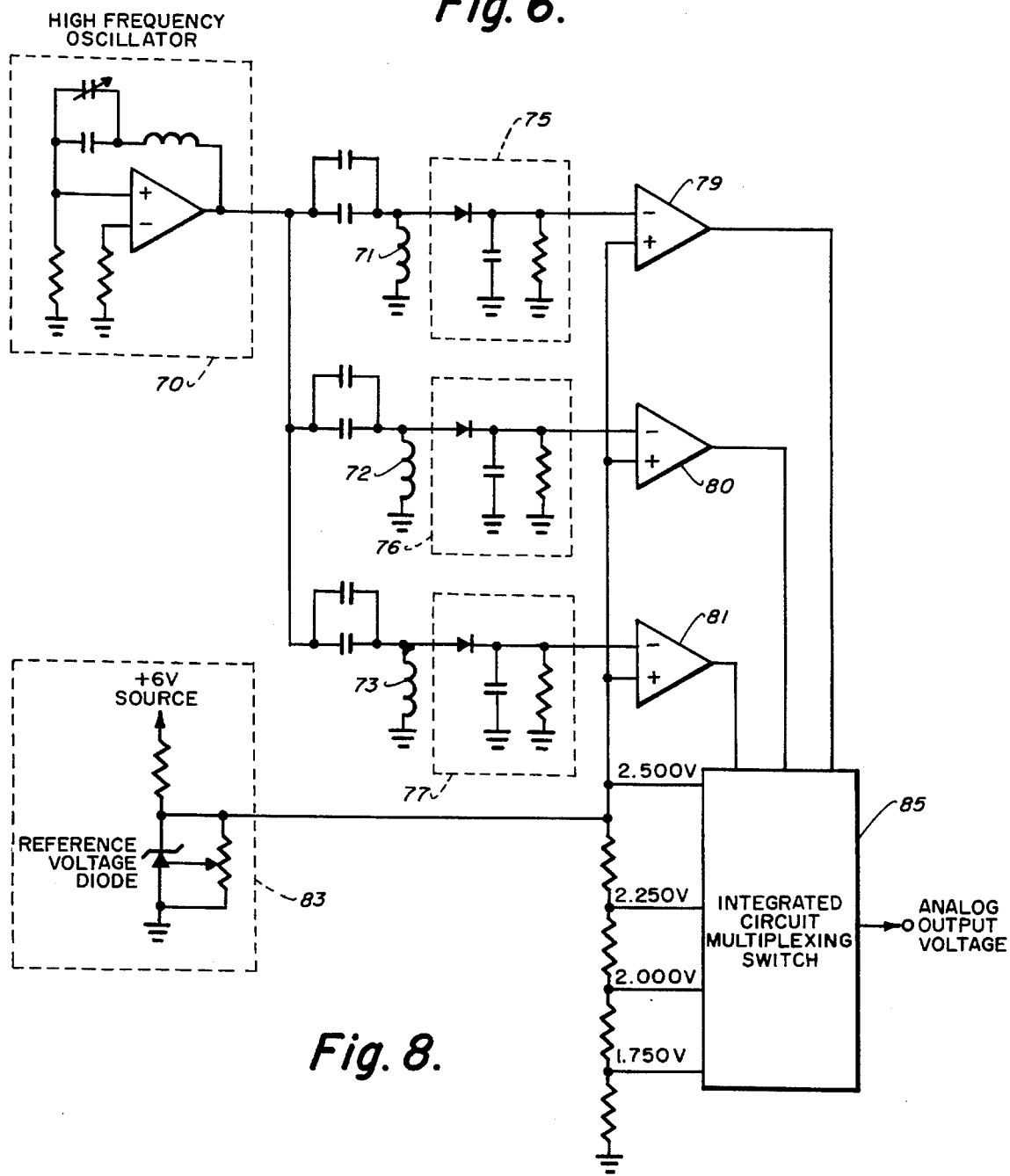
Fig. 6.
Fig. 8.

5,550,474

BATTERY ELECTROLYTE-LEVEL AND ELECTROLYTE-STRATIFICATION SENSING SYSTEM

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

This invention relates in general to battery monitoring devices and, in particular, to a sensor system for monitoring the level of liquid electrolyte in a wet cell battery and also for sensing the stratification of electrolyte indicating a change in the specific gravity at various electrolyte levels.

At high charge rates, a portion of the water in the electrolyte of a lead-acid storage cell is lost by electrolysis. If, as a result of this loss and losses by other mechanisms such as evaporation, the electrolyte level drops so low as to expose the surface of the cell electrodes, the cell may be quickly and permanently damaged. On the other hand, if a cell is overwatered prior to the charging of the battery, the electrolyte may overflow during or following charging with deleterious consequences.

Accurate and reliable information about electrolyte level is particularly valuable in cases where a high capacity, many cell battery system is used to provide operating or emergency power. Typically, the electrolyte level in such systems is monitored by periodic visual inspection of randomly selected cells (if the battery container is transparent) or by opening the cells and inserting a dip tube to determine the liquid level. Obviously, this approach is of limited effectiveness in detecting problems and is also time consuming. Often batteries are located in inaccessible areas further complicating manual monitoring.

Many methods have been proposed to monitor the level of electrolyte in a wet cell battery. Generally, these prior methods generate a signal when the liquid in a cell falls below, or rises to, a predetermined level. However, these prior methods have frequently proven to be unreliable, inaccurate or unduly complicated. Further, large lead-acid batteries suffer from the problem of electrolyte sulfation and stratification. When a cell is charged, acid is formed at the plates and this more dense acid tends to sink to the bottom of the cell. In tall cells, where diffusion is insufficient to overcome the density gradient, it is necessary to know when stratification occurs in order that some mechanical agitation or other means can be provided to circulate the electrolyte and maintain a homogeneous electrolyte.

A simple, reliable, and accurate sensor system for indicating the instantaneous liquid level and also for indicating when stratification occurs, which is capable of transmitting the data to a remote location, is highly desirable. The present invention is intended to provide such a sensor system. A device for merely monitoring the specific gravity of battery wet cells also is possible with the techniques of this invention.

SUMMARY OF THE INVENTION

It is therefore an object of the present invention to provide a continuous indication of the electrolyte level in a wet cell battery.

Another object of the present invention is to provide for remote monitoring of the electrolyte level and/or stratification in a wet cell battery.

A further object of the present invention is to provide apparatus having no moving parts for monitoring the electrolyte level and/or stratification in a wet cell battery.

Another object of the present invention is to monitor the electrolyte level and/or stratification of a wet cell battery without risking the introduction of contaminating substances in the electrolyte.

These and other objects are accomplished in the present invention through the use of a sensor probe in which a plurality of electrolyte level sensors and/or specific gravity change indicators are stacked in a vertical column. The level sensing coils are embedded in the walls of a hollow electrically insulating and chemically nonreactive elongated probe housing. Specific gravity sensors also may be located within the column. The sensor probe is suspended in the electrolyte and signals from the liquid level sensing coils and/or specific gravity sensors are fed to circuitry for indicating the level of the electrolyte and/or changes in specific gravity at various levels which will indicate stratification of electrolyte, respectively. The present techniques avoid mechanical and corrosion problems of prior type sensors due to the fact that only the fields of the sensors are changed by the amount of electrolyte in the area of the sensor coils, none of the sensors contact the electrolyte. The system components are isolated from direct electrolyte effects and signals may be read as digital or analog outputs.

BRIEF DESCRIPTION OF THE DRAWINGS

FIG. 1 is a vertical view of a preferred embodiment of the electrolyte sensing probe of the present invention.

FIG. 2 shows a battery cell with a sensing probe as in FIG. 1.

FIG. 3 is a cross-sectional view taken across line 3—3 of FIG. 1.

FIG. 4 is a cross-sectional view taken across line 4—4 of FIG. 1.

FIG. 5 is an enlarged vertical cross-sectional view of a portion of the sensor probe illustrated in FIG. 1 showing a level sensing coil section and stratification/specific gravity sensing section.

FIG. 6 is a block diagram of resonant circuit technique used for indicating presence or absence of electrolyte.

FIG. 8 is a circuit diagram of a three-coil resonant sensing system.

DESCRIPTION OF THE PREFERRED EMBODIMENTS

Figure 7:
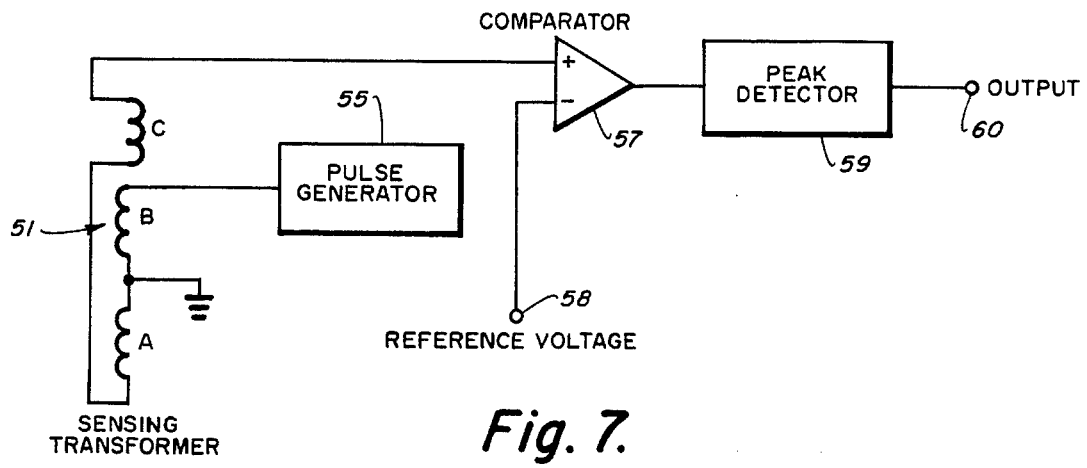
FIG. 7 is a block diagram of an inductive-sensing technique using a balanced transformer for sensing an electrolyte level.

The level sensor system of the present invention comprises a probe unit 10, as illustrated in FIG. 1, which is inserted into the electrolyte of a battery wet cell 12 at a convenient location, such as the corner of the cell casing, as shown in FIG. 2 for example. The probe unit shown consists of a sensor section 14 and an electronic section 15, although the electronics may be housed in any convenient location and the probe configuration may be of any suitable shape or size to suit the environment and media being measured.

Sensor section 14 of probe unit 10 consists of an electrically insulating and chemically nonreactive housing 17 of generally columnar shape for conveniently holding a plurality of electrolyte level sensor coils 19 in a stacked relationship. The housing 17 also houses a plurality of specific gravity sensors, hereinafter described, also located in a stacked arrangement, as shown in FIG. 1. Both the electrolyte level sensor coils and the specific gravity sensors are located along the vertical housing length in the areas where electrolyte level and electrolyte stratification need to be measured.

The specific gravity sensors which are used to indicate stratification of the electrolyte, in order that a command signal may be given to indicate that the electrolyte needs to be circulated, comprise a plurality of specific gravity indicator coils 21 similar to the electrolyte level indicator coils 19. The housing 17, at least in the area of the specific gravity sensor coils 21, is hollow, as shown in FIG. 3; preferably it should be hollow along its entire length. Elongated windows or openings 23 are provided along the length of housing 17 to provide for access and/or circulation of the electrolyte. Specific gravity floats 25, (shown in FIG. 5) are located within the hollow portion of elongated housing 17 and are confined, one to each specific gravity sensor, by means of float locks 28, as shown in FIGS. 1, 4 and 5, for each level at which specific gravity is to be measured to determine whether or not stratification has occurred. A float lock 28 is also included at the bottom of housing 17 to retain the bottom float 25 from accidentally falling out. The sensing coils 19 and 21 are shown in greater detail in FIG. 5, the operation of which will be hereinafter described. Additional electronic circuitry can be housed in electronics housing 15 and connected by a data bus connector 30 to a data read out and/or command center located remotely from the wet cell being monitored. Leads 31 and 31 are connected to the wet cell terminals for the purpose of monitoring the cell voltage. Normally a plurality of this type of system is used to monitor a large number of cells in a battery bank.

Floats 25 may be spherical, as shown in FIG. 5, or of any suitable shape. The floats may be made from any suitable material (e.g. wax) such that each float has a predetermined density and floats at a predetermined specific gravity. For measuring stratification of electrolyte, the floats would preferably be of the same density in order that each of the floats will rise when the specific gravity at their respective levels increases above the desired specific gravity. (If desired, the density of the floats can be such that the floats are normally in a floating position, i.e. such as float 25', and will sink when the specific gravity of the electrolyte drops below a desired value.) The specific gravity of the electrolyte at each level being monitored will determine whether or not the float 25 at that level will float or sink. In the arrangement shown in FIGS. 1 and 5, the floats 25 are normally in a sunken position, and when the specific gravity at one of the levels being monitored increases above a predetermined value the float will rise until it reaches a float stop 28 which holds the float within the area of a sensor coil 21 which senses its presence. Once the specific gravity at that level is returned to the desired predetermined value the float will sink away from the sensor coil and no longer be sensed. This arrangement is best illustrated in FIG. 5 where float 25 at one level being monitored for stratification is show in a sunken position and resting at the bottom of that level against a float stop 28 while directly beneath float 25' is shown in a floating position up against float stop 28 and within a sensing coil 21. Float 25' in turn is sensed by the sensing coil 21 since it has caused a change in the medium within the coil.

Float 25, for example, when it rises up to float stop 28 and is within the area of coil 21, as in FIG. 5, displaces a quantity of electrolyte equal to its volume. This results in a change in the "Q" (i.e. coupling efficiency) of the adjacent coil because there is less electrolyte within the coil 21 area than there was before the float occupied part of the space within that area. This change can be detected, as hereinafter described.

Using a scheme, similar to that such as used to sense electrolyte stratification, where sensing coils are used to indicate a change in specific gravity, a battery wet cell may be monitored merely for determining the specific gravity, in order that a desired specific gravity may be maintained in a cell to keep the cell in good working condition. With a plurality of floats of different density a range of specific gravity values can be measured.

In the sensing scheme shown in the block diagram of FIG. 6, a high-frequency signal from a high frequency source 40, i.e. an oscillator, excites a sensing coil 42 which is arranged as part of a resonant circuit. Any voltage change across coil 42 is detected by detector 43 causing a signal to be applied to comparator 45, the output of which indicates the presence or absence of electrolyte in the vicinity of the sensing coil 42. The resonant circuit operates as follows: In the absence of electrolyte surrounding the area about the sensing coil 42, the "Q" of the sensing coil will be high and the series-resonant circuit provides a voltage step-up. The detecter output at 46 will then exceed the comparator reference voltage 47 and the comparator output 49 will be low. When electrolyte surrounds the area about the sensing coil 42, however, the Q of the coil will be lowered because of the currents induced in the electrolyte, i.e. lossy conductor. The detected sensing coil voltage, therefore, will drop below the comparator reference voltage and the comparator output will be high. This type of sensing arrangement can be used in a circuit arrangement using a plurality of sensors, etc. as hereinafter described in reference to FIG. 8.

Another, and perhaps more sensitive, sensing technique is inductive sensing which makes use of balanced transformers instead of simple sensing coils. As shown in FIG. 7, a sensing transformer 51 consists of three coils A, B, and C wound adjacently on a common form. A pulse generator 55 is used to apply a pulse to the center winding B which excites equal signals in the two outer coils A and C. The coils are series connected in such a manner, as shown, that the sum voltage is zero. When the transformer coils are positioned such that the lower coil A, for example, is surrounded by electrolyte, the change in Q from that in air causes an imbalance of the transformer and effects the voltage output. In other words, the presence of electrolyte around coil A reduces the voltage in the adjacent coil so that the sum of the voltages from the other two coils is no longer zero and an input pulse is present at the input to comparator 57. When the input pulse to comparator 57 exceeds the reference voltage 58 the comparator produces an output pulse which charges a capacitor in peak detector 59 (i.e. a peak-hold circuit) to a high level, indicating the presence of electrolyte. As electrolyte rises and coil B and then coil C is surrounded by electrolytes, the output voltage at 60 will continue to rise indicating that the electrolyte is at full level. As the electrolyte level decreases and lowers past the coils, the voltage at output 60 will decrease until the level is below the lower coil where the output from the transformer balances out to zero indicating no presence of electrolyte. The output at 60 from this inductive sensing circuit, as well as output 49 from the previously described resonant circuit, is monitored via a data bus to inform a command station of the cell condition in order that electrolyte may be added to prevent damage to a cell or, in the case of stratification of the electrolyte, circulation of the electrolyte can be provided.

While any number of sensors may be used to indicate various electrolyte levels, three sensors are employed in the system illustrated to indicate electrolyte level as falling in any one of four ranges. The sensing coils are mounted as shown in FIG. 1, inside housing 17, an acrylic plastic tube, for example, which also houses the electrolyte stratification monitoring system.

The sensing coils for either the electrolyte level sensing, i.e. coils 19, or the specific gravity sensors, i.e. coils 21, can be the type used in the resonant circuit of FIG. 6 or the type used in the inductive sensing circuit of FIG. 7. In the later case, where a balanced transformer consisting of three coils is used, all three transformer coils A, B and C are used as a single sensing coil at 19 or 21 on the sensing portion 14 of probe 10. This is more clearly illustrated in FIG. 5 where coil 19 and coils 21 are each shown as three stacked coils connected together and forming a balanced transformer as in FIG. 7. As has been indicated, while coils 19 and 21 are illustrated as three stacked coils of a balanced transformer in FIG. 5 (but which operate as a single sensing coil means) a single resonant circuit sensing coil, like coil 42 of FIG. 6, may be used. The sensor portion 14 of probe 10 is immersed into the electrolyte being measured to a depth depending upon the desired electrolyte level of the cell being monitored.

The size of the sensing coils 19 or 21 is a compromise between considerations of sensitivity and accuracy. The wall thickness of housing tube 17 sets the minimum coil dimension; too small a coil will have so localized a magnetic field that little of the field will extend into the surrounding electrolyte and thus the effect of the surrounding electrolyte on the Q of the coil will be unappreciable. As a coil is made larger the magnetic field will extend further, not only into the electrolyte, but vertically as well. The precise level of electrolyte which will trigger the comparator thus becomes more poorly defined as the coil size is made larger. For a housing tube wall thickness of 2 to 3 millimeters a coil diameter of about 1 centimeter is a reasonable compromise.

Because it is desired to transmit information from all three sensing coils on a single channel of a monitoring system, the digital signals from each of the three sensing circuits are combined into a single analog level. This is accomplished conveniently with the circuits shown in FIGS. 8 and 9. Each of these circuits includes an accurate reference voltage source, e.g. 2.5 volts, which is resistively divided to provide four accurate voltages of, 2.500, 2.250, 2.000, and 1.750 volts, for example; more can be provided as the need may be, such as where more than three levels of electrolyte stratification are desired to be monitored.

The three-coil resonant sensing system shown in the circuit diagram of FIG. 8 uses three resonant circuits of the type shown in FIG. 6 and described above. A single oscillator 70 provides a high frequency signal source to each of the three sensing coils 71, 72 and 73 to excite the coils. A voltage change across any of the coils will be detected by their respective detectors 75, 76 and 77 and applied to comparators 79, 80 and 81, respectively, indicating a presence or absence, whatever the case may be, of electrolyte, or a change in the medium surrounding the coils that effects the Q of the coils, as previously discussed in regard to the resonant circuit of FIG. 6. The reference voltage is provided to each of the comparators 79, 80 and 81 by reference voltage diode circuit 83 which is also applied to an integrated-circuit multiplexing switch 85. As previously mentioned, the 2.5 volt accurate reference voltage is resistively divided to provide four accurate voltages (2.500, 2.250, 2.000, and 1.750 volts) or more if more than four levels are to be monitored. One of the four accurate voltages is selected by the integrated-circuit multiplexing switch 85 in accordance with the three-bit digital signal comprised of the three outputs from comaparators 79, 80 and 81. With the circuit as shown, in FIG. 8, the output from multiplexer 85 will provide signals as indicated in Table 1, below.

TABLE 1

| CONDITION: | OUTPUT VOLTAGE: |
| --- | --- |
| Electrolyte above upper coil level | 2.500 |
| Electrolyte between top coil and middle coil | 2.250 |
| Electrolyte between middle and lowest coil | 2.000 |
| Electrolyte below lowest coil | 1.750 |

Figure 9:
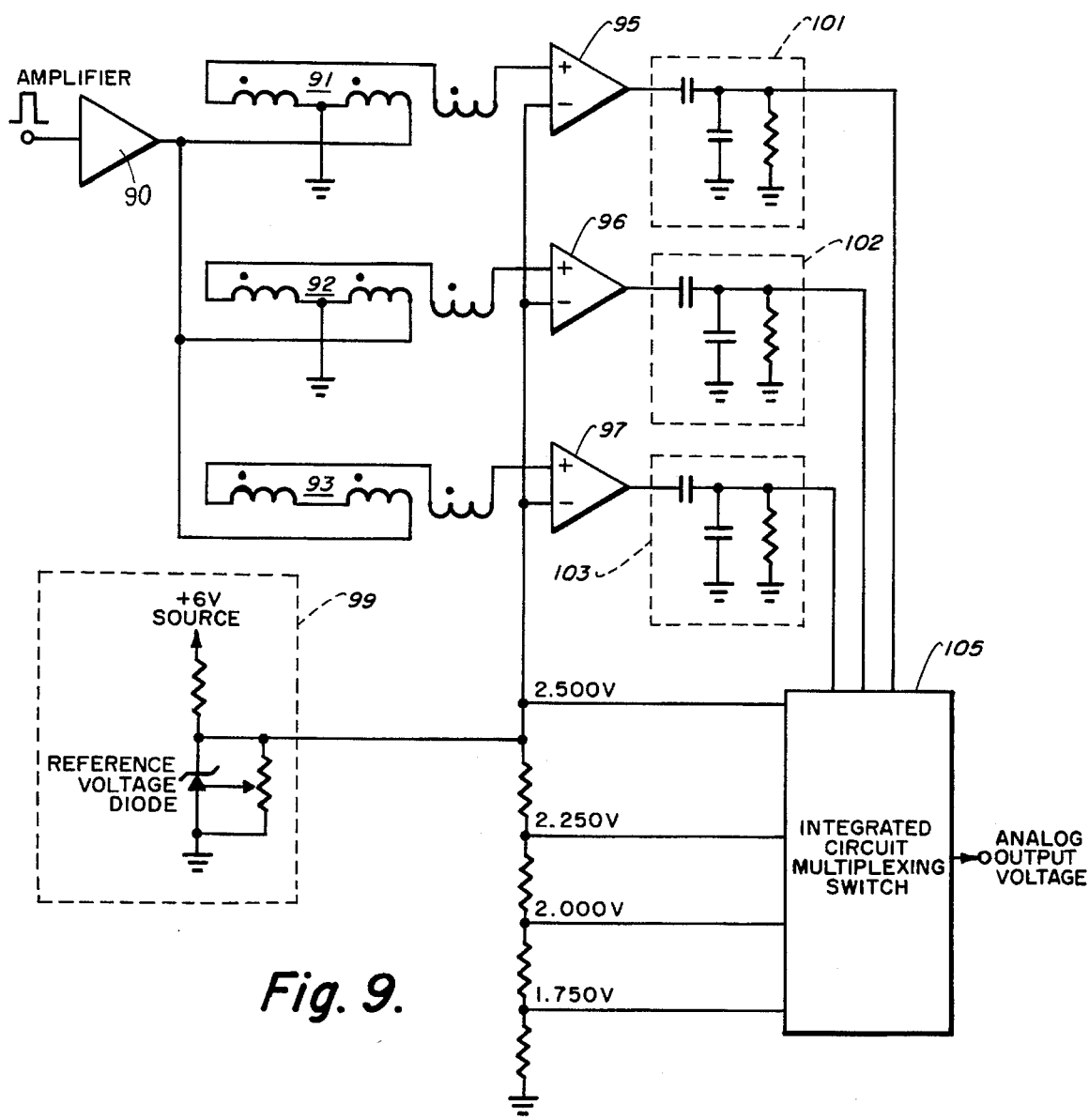
FIG. 9 is a circuit diagram of a three-sensor balanced-transformer sensing system.

Similar to the circuit shown in FIG. 8 is the three-sensor balanced-transformer sensing system illustrated in the circuit diagram of FIG. 9. In this circuit three circuits, such as shown in FIG. 7, are combined into a multiple level sensor system. Amplifier 90 is used to apply a pulse to the center winding of each of the balanced transformers 91, 92, and 93, and when there is an imbalance of any one of the transformers caused by a change in Q, as discussed above in regard to FIG. 7, an input pulse is presented to a respective comparator 95, 96 or 97. When the input pulse to any of the comparators exceeds the reference voltage, e.g. 2.5 volts, provided by an accurate reference voltage diode circuit 99, the respective comparator produces an output pulse which charges the capacitor in a respective peak-hold circuit (i.e. peak detector) 101, 102, or 103 to a high level, indicating a change in the media at the level being monitored. As in FIG. 8, the accurate 2.5 volt reference voltage from voltage source circuit 99 is resistively divided and connected to an integrated-circuit multiplexing switch 105. The outputs from the peak-hold circuits are fed to multiplexing switch 105 and, in accordance with the three-bit digital signal comprised of the three comparator outputs, one of the values as listed in Table 1, above, is selected, representing the electrolyte condition listed. The same type of voltage values listed in Table 1 may be used to represent an electrolyte stratification condition at any of four (or more) levels, as previously discussed.

While FIG. 1 shows both an electrolyte level sensing and an electrolyte stratification sensing system on one probe, each may be placed on separate or individual wet cell probes; however, for practical purposes it is more convenient to combine the level and stratification sensing operations together on a single long probe. As mentioned earlier, while only three sensors are illustrated for each of the circuits shown in FIGS. 8 and 9, more may be used if more than four electrolyte levels are desired to be sensed, or if four levels for electrolyte stratification sensing are preferred, as shown in FIG. 1. The analog output voltages from the multiplexing switches 85 or 105 are connected to a common read-out and/or control means for monitoring a single or a plurality of battery cells and to control (remotely or otherwise) pumping of additional electrolyte liquid into a battery cell when required, thus making an automatic level control systen, or for providing circulation of the electrolyte to eliminate stratification whenever that occurs.

The sensing system is isolated from the effects of direct electrolyte contact since it is imbedded in an acrylic plastic or similar non-corrosive material, and sensing may be read as a digital or analog output. Adjustment of the probe sensing unit also may be made externally from the battery cell by remote control positioning, if desired.

Obviously many modifications and variations of the present invention are possible in the light of the above teachings. It is therefore to be understood that within the scope of the appended claims, the invention may be practiced otherwise than as specifically described.

What is claimed is:

1. In a battery wet cell monitoring system, an electrolyte level sensing device, comprising:
   a. a probe housing of electrically insulating and electrolyte nonreactive material; said probe housing being of suitable size and shape for extending into the electrolyte of a wet cell battery;
   b. a plurality of electrical coils embedded within said probe housing at various predetermined levels and insulated from coming into contact with the battery cell electrolyte; each of said plurality of electrical coils comprising three adjacent commonly-wound coils of a balanced transformer;
   c. a pulse generator means connected to apply a signal to the center coil of each of said plurality of three commonly-wound transformer coils; each of said plurality of three commonly-wound transformer coils being series connected such that the sum voltage is zero in air;
   d. the output of each said balanced transformer being connected to a comparator and detector circuit, wherein, as said transformer coils are sequentially surrounded by electrolyte the change in the Q of the coils results in an increase in transformer voltage output, which output, when it exceeds a predetermined amount, causes said comparator and detection circuit to produce an output that indicates the presence of a predetermined amount of electrolyte;
   e. read-out means connected to said detection circuit wherein indicator signals from said detection circuit are used to indicate the electrolyte level within the battery cell.

2. A battery electrolyte monitoring system as in claim 1 wherein a plurality of said balanced transformers together with said respective comparator and detector circuits are connected to an integrated circuit multiplexing switch for obtaining a simultaneous readout of a plurality of electrolyte levels being monitored.

3. A battery electrolyte monitoring system as in claim 1 wherein said respective indicator signals are fed to a data bus for remote read-out of said electrolyte levels being monitored and for controlling electrolyte conditions.

4. A battery electrolyte monitoring system as in claim 2 wherein said multiplexing switch provides analog output voltages connected to a common read-out and control means for monitoring any of a plurality of battery wet cells, for providing automatic control to add additional electrolyte to a wet cell as needed, and to provide circulation of electrolyte to eliminate stratification thereof when such occurs.

5. A battery electrolyte monitoring system as in claim 1 wherein a plurality of said balanced transformers together with said respective comparator and detector circuits are connected to an integrated circuit multiplexing switch for obtaining a simultaneous readout of a plurality of electrolyte levels being monitored.

6. A battery electrolyte monitoring system as in claim 5 wherein said multiplexing switch provides analog output voltages connected to a common read-out and control means for monitoring any of a plurality of battery wet cells, for providing automatic control to add additional electrolyte to a wet cell as needed, and to provide circulation of electrolyte to eliminate stratification thereof when such occurs.

7. A battery electrolyte monitoring system as in claim 1 wherein said probe housing is of acrylic plastic.

8. A battery electrolyte monitoring system as in claim 1 wherein said probe housing is of generally elongated shape and said electrical coils are located in a stacked arrangemenmt within said probe housing.

9. A battery electrolyte monitoring system as in claim 1 wherein a plurality of said monitor stytems are used for monitoring a bank of battery wet cells at a common readout location.

10. A battery electrolyte monitoring system as in claim 1 wherein respective indicator signals from each of said electrical coils are digitized and combined into a single analog level for transmitting information on a single monotoring system channel.

11. In a battery wet cell monitoring system, an electrolyte stratification sensing device, comprising:
   a. a probe housing of electrically insulating and electrolyte nonreactive material; said probe housing being hollow and of suitable shape for extending into the electrolyte of a battery wet cell; said hollow probe housing being provided with a plurality of passageways therein to provide for efficient circulation of electrolyte therethrough;
   b. a plurality of electrical coils embedded within said probe housing at various predetermined electrolyte depths and insulated from coming into contact with the battery cell electrolyte; each of said plurality of electrical coils comprising three adjacent commonly-wound coils of a balanced transformer;
   c. a pulse generator means connected to apply a signal to the center coil of each of said plurality of three commonly-wound transformer coils; each of said plurality of three commonly-wound transformer coils being series connected such that the sum voltage is zero in air;
   d. the output of each said balanced transformer being connected to a comparator and detector circuit, wherein, as said transformer coils are sequentially surrounded by electrolyte the change in the Q of the coils results in an increase in transformer voltage output, which output, when it exceeds a predetermined amount, causes said comparator and detection circuit to produce an output that indicates the presence of a predetermined amount of electrolyte;
   e. a specific gravity float means associated with each said plurality of balanced transformers, respectively, and retained within said hollow probe housing; each specific gravity float means being retained within said housing in a specific area for operation relative to its respective balanced transformer;
   f. each specific gravity float means being operable to displace a predetermined amount of electrolyte such that when a float means moves to a location within the area of its respective balanced transformer the amount of electrolyte surrounding the balanced transformer is reduced (and vice versa) thereby causing a change in the Q of the transformer coils and resulting in a change in voltage across the coils;
   g. read-out means connected to said detection circuit wherein indicator signals from said detection circuit are operable to indicate a change in electrolyte specific gravity at each respective electrolyte depth within the battery cell.

12. A battery electrolyte monitoring system as in claim 11 wherein said respective indicator signals are fed to a data bus for remote read-out of said electrolyte levels being monitored and for controlling electrolyte conditions.

13. A battery electrolyte monitoring system as in claim 11 wherein each of said specific gravity floats is of the same density.

14. A battery electrolyte monitoring system as in claim 11 wherein each of said specific gravity floats is of a different density allowing the monitoring system to operate for measuring specific gravity of the battery cell electrolyte over a predetermined range of values.

15. A battery electrolyte monitoring system as in claim 11 wherein said probe housing is of acrylic plastic.

16. A battery electrolyte monitoring system as in claim 11 wherein said probe housing is of generally elongated shape and said balanced transformer coils are located in a stacked arrangement within said probe housing.

17. A battery electrolyte monitoring system as in claim 11 wherein a plurality of said monitor systems are used for monitoring a bank of battery wet cells at a common readout location.

18. A battery electrolyte monitoring system as in claim 11 wherein respective indicator signals from each of said balanced transformers are digitized and combined into a single analog level for transmitting information on a single monitoring system channel.

* * * * *